United States Patent
Fujiya et al.

(10) Patent No.: US 11,235,408 B2
(45) Date of Patent: Feb. 1, 2022

(54) METHOD FOR BONDING DISSIMILAR METALS TO EACH OTHER

(71) Applicant: MITSUBISHI HEAVY INDUSTRIES, LTD., Tokyo (JP)

(72) Inventors: Yasuyuki Fujiya, Tokyo (JP); Ken Ishii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 330 days.

(21) Appl. No.: 16/320,862

(22) PCT Filed: Oct. 12, 2017

(86) PCT No.: PCT/JP2017/036952
§ 371 (c)(1),
(2) Date: Jan. 25, 2019

(87) PCT Pub. No.: WO2018/074312
PCT Pub. Date: Apr. 26, 2018

(65) Prior Publication Data
US 2019/0160576 A1 May 30, 2019

(30) Foreign Application Priority Data

Oct. 17, 2016 (JP) .............................. JP2016-203499

(51) Int. Cl.
*B23K 9/02* (2006.01)
*B23K 9/23* (2006.01)
(Continued)

(52) U.S. Cl.
CPC ................ *B23K 9/04* (2013.01); *B22F 10/20* (2021.01); *B23K 15/0086* (2013.01);
(Continued)

(58) Field of Classification Search
CPC ........ B23K 1/14–18; B23K 9/02–0288; B23K 9/20–206; B23K 9/23–232;
(Continued)

(56) References Cited

U.S. PATENT DOCUMENTS 9,545,685 B2 * 1/2017 Karner ..................... B23K 9/23
2009/0092872 A1 * 4/2009 Miyazawa .......... H01M 8/1004
429/434
(Continued)

FOREIGN PATENT DOCUMENTS

CN 102303191 A 1/2012
GB 2501028 A 10/2013
(Continued)

OTHER PUBLICATIONS

International Search Report for International Application No. PCT/JP2017/036952, dated Dec. 5, 2017, with English translation.
(Continued)

*Primary Examiner* — Michael A Laflame, Jr.
(74) *Attorney, Agent, or Firm* — Birch, Stewart, Kolasch & Birch, LLP

(57) ABSTRACT

Provided is a method for bonding dissimilar metals to each other, the method comprising: dissimilar metal layer-forming steps (P2), (P3), (P4) for supplying, to form dissimilar metal layers; a second metal layer-forming step (P5) for supplying, on the surface of the dissimilar metal layers, a filler material formed of a second metal, and heating the filler material formed of the second metal to a temperature equal to or higher than a melting point of the second metal, to form a second metal layer formed of the second metal; and a second material-to-be-bonded welding step (P6) for welding a second material to be bonded that is formed of the second metal, onto the second metal layer.

5 Claims, 7 Drawing Sheets

(51) Int. Cl.
| | |
|---|---|
| *B23K 11/10* | (2006.01) |
| *B23K 9/04* | (2006.01) |
| *B23K 26/342* | (2014.01) |
| *F01D 1/06* | (2006.01) |
| *F01D 25/00* | (2006.01) |
| *B23K 15/00* | (2006.01) |
| *B23K 31/12* | (2006.01) |
| *B22F 10/20* | (2021.01) |
| *B23K 101/00* | (2006.01) |
| *B23K 103/18* | (2006.01) |
| *B22F 7/02* | (2006.01) |
| *B23K 103/20* | (2006.01) |

(52) U.S. Cl.
CPC ............ *B23K 26/342* (2015.10); *B23K 31/12* (2013.01); *F01D 1/06* (2013.01); *F01D 25/00* (2013.01); *B22F 7/02* (2013.01); *B22F 2207/13* (2013.01); *B22F 2207/17* (2013.01); *B22F 2998/10* (2013.01); *B23K 2101/001* (2018.08); *B23K 2103/18* (2018.08); *B23K 2103/20* (2018.08)

(58) Field of Classification Search
CPC ............................... B23K 11/08; B23K 11/10; B23K 13/04–043; B23K 15/0046–0053; B23K 26/24–244
See application file for complete search history.

(56) References Cited

U.S. PATENT DOCUMENTS

| | | | |
|---|---|---|---|
| 2011/0123825 | A1 | 5/2011 | Sakurai et al. |
| 2013/0140280 | A1* | 6/2013 | Biskup .................. B23K 9/025 219/74 |
| 2015/0028010 | A1* | 1/2015 | Peters .................... B23K 9/093 219/130.51 |
| 2015/0028011 | A1* | 1/2015 | Peters ...................... B23K 9/09 219/130.51 |
| 2016/0221106 | A1* | 8/2016 | Bush ........................ B23K 9/24 |
| 2017/0144257 | A1* | 5/2017 | Sasaki ............... B23K 35/0266 |
| 2017/0297137 | A1* | 10/2017 | Perry .................. B23K 35/302 |
| 2018/0078990 | A1* | 3/2018 | Pietzka .................. B23K 26/24 |
| 2019/0001427 | A1* | 1/2019 | Shuck ..................... B23K 1/19 |

FOREIGN PATENT DOCUMENTS

| | | |
|---|---|---|
| JP | 2982355 B2 | 11/1999 |
| JP | 5458031 B2 | 4/2014 |
| JP | 5553250 B2 | 7/2014 |
| KR | 10-0787929 B1 | 12/2007 |

OTHER PUBLICATIONS

Written Opinion of the International Searching Authority for International Application No. PCT/JP2017/036952, dated Dec. 5, 2017, with English translation.

\* cited by examiner

METHOD FOR BONDING DISSIMILAR METALS TO EACH OTHER

TECHNICAL FIELD

The present invention relates to a method for bonding dissimilar metals to each other.

Priority is claimed on Japanese Patent Application No. 2016-203499, filed Oct. 17, 2016, the content of which is incorporated herein by reference.

BACKGROUND ART

In the related art, melting welding, such as electric arc welding, laser welding, and resistance welding, is used as methods of bonding dissimilar metals, such as iron (Fe), and aluminum (Al) to each other, or coating the surface of a metal base material a metallic material different from the metal base material.

PTL 1 discloses a method of forming a gradient function part in a boundary layer between both the metal base material and the metallic material and its vicinity when the surface of the metal base material is coated with the metallic material different from the metal base material. The gradient function part is a part where the structure of a metal base material and the structure of the coated layer are diffused toward each other, and the distributions of both metal base material and the coated layer shows a continuous change from the coated layer side from the metal base material side.

CITATION LIST

Patent Literature

[PTL 1] Japanese Patent No. 2982355

SUMMARY OF INVENTION

Technical Problem

Meanwhile, in a combination of aluminum, iron, and the like, a weak reaction layer (intermetallic compound) is produced at a bonded interface, and simultaneously, physical properties, such as the coefficients of linear expansion, are significantly different from each other. Accordingly, the thermal stress generated in the bonded interface becomes large, cracks are likely to be generated at the interface, and it is difficult to perform melting welding.

There is also a mechanical bonding method or a method of bonding dissimilar metals using an adhesive. However, in the mechanical bonding method, an increase in weight poses a problem, and a shortage of strength poses a problem in the method using an adhesive.

An object of the invention is to provide a method for bonding dissimilar metals to each other that enables melting bonding in a case where a combination of dissimilar metals in which the melting bonding is difficult because cracks are generated or an intermetallic compound is produced is bonded.

Solution to Problem

According to an aspect of the invention, a method for bonding dissimilar metals to each other includes a dissimilar metal layer forming step of supplying a mixed filler material, including a filler material formed of a first metal and particles formed of a second metal having a higher melting point than the first metal, to a surface of a first material to be bonded that is formed of the first metal, and heating the mixed filler material to a temperature equal to or higher than a melting point of the first metal and equal to or lower than a melting point of the second metal, to form a dissimilar metal layer; a second metal layer forming step of supplying a filler material formed of the second metal to a surface of the dissimilar metal layer, and heating the filler material formed of the second metal to a temperature equal to or higher than the melting point of the second metal, to form a second metal layer formed of the second metal; and a second material-to-be-bonded welding step of welding a second material to be bonded, which is formed of the second metal, to the second metal layer.

With such a configuration, the first metal that constitutes the dissimilar metal layer is welded to the first material to be bonded, and the second metal layer and the second metal dispersed in the dissimilar metal layer are welded to each other when the second metal layer is formed. Next, by welding the second material to be bonded to the second metal layer, it is possible to secure required strength and perform bonding even in combinations of metals that produce a weak intermetallic compound by being mixed with each other.

In the above method for bonding dissimilar metals to each other, a dissimilar metal laminated layer structure in which a plurality of the dissimilar metal layers are sequentially laminated may be formed by repeating the dissimilar metal layer forming step, execution may be performed such that a proportion of the first metal in the mixed filler material to be used in a first dissimilar metal layer forming step of a laminating sequence is larger than a proportion of the second metal, and second and subsequent dissimilar metal layer forming steps of the laminating sequence may be executed such that, as the laminating sequence increases, the proportion of the second metal becomes sequentially larger and the proportion of the first metal becomes sequentially smaller.

With such a configuration, the bonding strength between the first material to be bonded and the second material to be bonded can be increased by changing the proportion of the second metal so as to become gradually larger.

In the above method for bonding dissimilar metals to each other, the plurality of dissimilar metal layer forming steps may be executed such that a particle diameter of each of particles of the second metal becomes sequentially smaller as the laminating sequence increases.

With such a configuration, the particles of the second metal can be gradually melted without changing the heating temperature in welding. Accordingly, the bonding strength between the dissimilar metal layer and the second metal layer can be increased.

In the above method for bonding dissimilar metals to each other, the plurality of dissimilar metal layer forming steps may be executed such that a heating temperature of the mixed filler material becomes higher as the laminating sequence increases.

With such a configuration, the particles of the second metal can be gradually melted as the laminating sequence increases. Accordingly, the bonding strength between the dissimilar metal layer and the second metal layer can be increased.

In the above method for bonding dissimilar metals to each other, the filler material formed of the first metal may be a wire.

With such a configuration, a layer of the first metal can be formed without using powder of the first metal by supplying the first metal in the wire. That is, problems, such as diffusion of the powder of the first metal, can be eliminated. Additionally, the amount of supply of the first metal can be adjusted by changing the feed speed or diameter of the wire.

Advantageous Effects of Invention

According to the invention, even in a combination of metals that produce a weak intermetallic compound, it is possible to secure required strength and perform the bonding.

DESCRIPTION OF EMBODIMENTS

First Embodiment

Hereinafter, a method for bonding dissimilar metals to each other in a first embodiment of the invention will be described in detail with reference to the drawings.

The method for bonding dissimilar metals to each other in the present embodiment is used when forming a bonding joint in which dissimilar metals, such as a first metal (for example, aluminum (Al); hereinafter, referred to as aluminum) and a second metal (for example, iron (Fe); hereinafter, referred to as iron), are bonded to each other.

Figure 1:
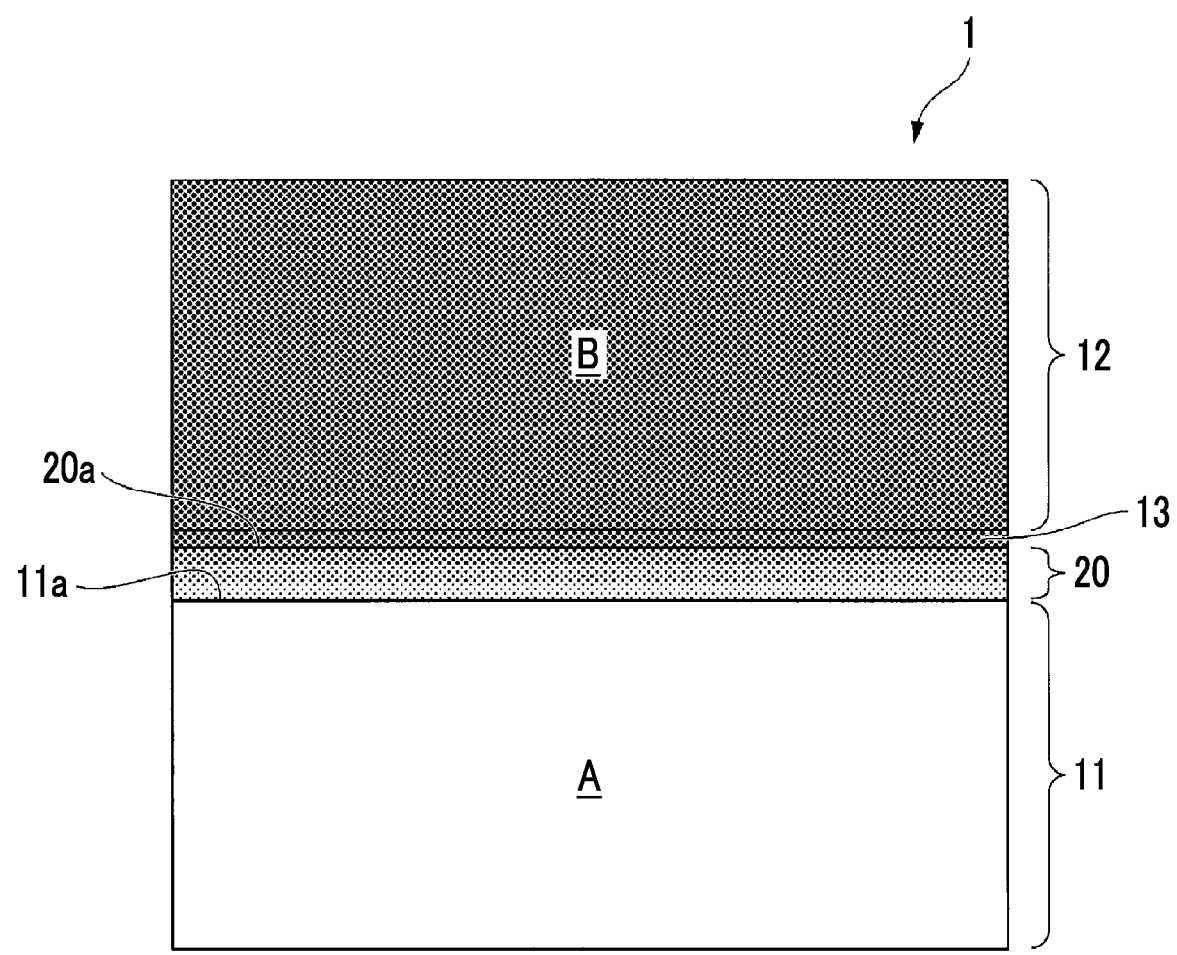
FIG. 1 is a schematic view of a bonding joint of a first embodiment of the invention as seen from a side.

As illustrated in FIG. 1, the bonding joint 1 is a joint in which a first material to be bonded 11 and a second material to be bonded 12 are bonded to each other using the method for bonding dissimilar metals to each other in the present embodiment. The bonding joint 1 has the first material to be bonded 11, the second material to be bonded 12 bonded to the first material to be bonded 11, and a dissimilar metal laminated layer structure 20 and a second metal layer 13 that are interposed between the first material to be bonded 11 and the second material to be bonded 12. The first material to be bonded 11 is formed of aluminum A. The second material to be bonded 12 and the second metal layer 13 are formed of iron B. The dissimilar metal laminated layer structure 20 is a structure in which particles of the iron B are dispersed in the aluminum A.

The bonding joint 1 of the present embodiment is obtained by forming the dissimilar metal laminated layer structure 20 including the aluminum A and the iron B on a surface 11a of the first material to be bonded 11 and then welding the second material to be bonded 12 to a surface 20a of the dissimilar metal laminated layer structure 20.

Figure 2:
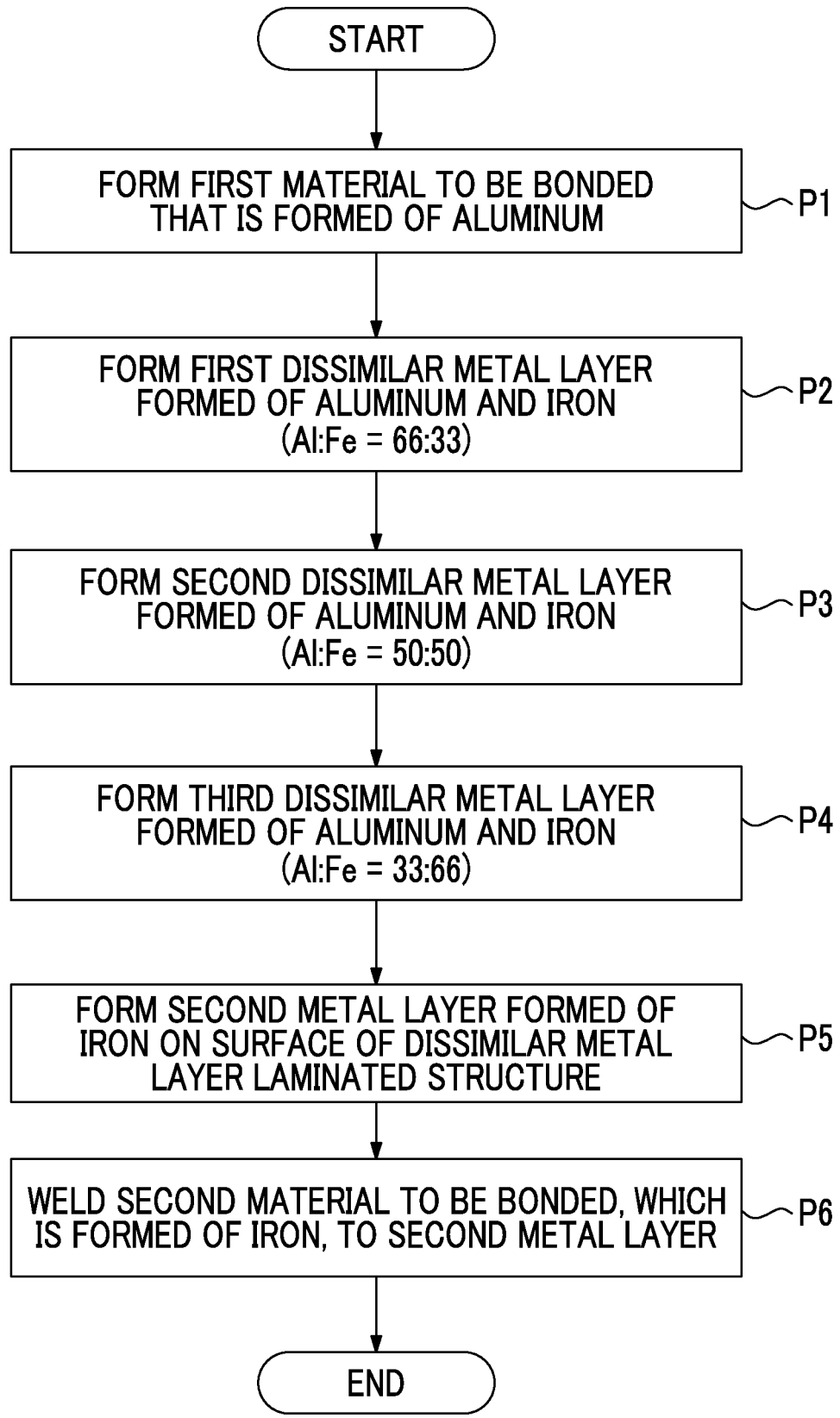
FIG. 2 is a flowchart of a method for bonding dissimilar metals to each other in the first embodiment of the invention.

As illustrated in FIG. 2, the method for bonding dissimilar metals to each other includes a first material-to-be-bonded forming step P1, dissimilar metal layer forming steps P2, P3 and P4, a second metal layer forming step P5, and a second material-to-be-bonded welding step P6. The dissimilar metal laminated layer structure 20 is formed by repeating the dissimilar metal layer forming steps P2, P3, and P4 and sequentially laminating a plurality of dissimilar metal layers 21, 22, and 23.

The first material-to-be-bonded forming step P1 is a step of forming the first material to be bonded 11 formed of the aluminum.

The dissimilar metal layer forming steps P2, P3, and P4 are steps of supplying a mixed filler material C (refer to FIG. 5) in which the particles of the aluminum A and the particles of the iron B are mixed with each other, to the surface 11a of the first material to be bonded 11, and heating the mixed filler material C, thereby forming the dissimilar metal layers 21, 22, and 23.

The second metal layer forming step P5 is a step of forming the second metal layer 13 formed of the iron B on the surface 20a of the dissimilar metal laminated layer structure 20 formed through the plurality of dissimilar metal layer forming steps P2, P3, and P4.

The second material-to-be-bonded welding step P6 is a step of welding the second material to be bonded 12 formed of the iron B to the second metal layer 13.

Figure 3:
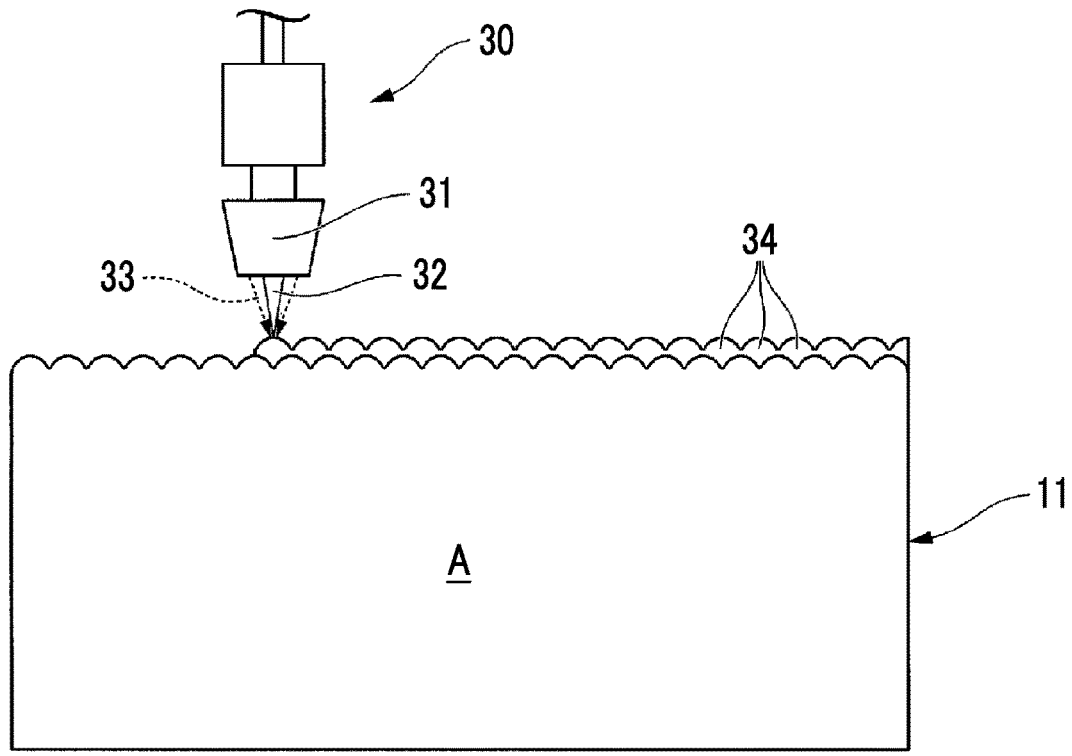
FIG. 3 is a schematic view illustrating a first material-to-be-bonded forming step of the first embodiment of the invention as seen from the side.

As illustrated in FIG. 3, the first material-to-be-bonded forming step P1 is a step of forming the first material to be bonded 11 formed of the aluminum A. In the first material-to-be-bonded forming step P1, a layer of the aluminum A is laminated using a laser metal deposition (hereinafter, referred to as "LMD") device 30 as a welding device.

The LMD device 30 is a device that forms beads 34 made of a metallic material, using laser metal deposition. The LMD is a method of irradiating a workpiece with laser and jetting metallic particles 33 (powder) to an irradiation region, thereby melting and building up the metallic particles 33 with the laser.

The LMD device 30 includes a nozzle 31 that has a radiation hole through which laser light 32 is radiated, and a jet port through which the metallic particles 33 is jetted. The nozzle 31 can also be provided with a supply port through which shielding gas is supplied. The laser light 32 applies the energy for melting the metallic particles 33 and a workpiece to the metallic particles 33 and the workpiece. The metallic particles 33 are a raw material for forming the beads 34. The shielding gas is an inert gas to be supplied in order to suppress oxidization of the beads 34.

The LMD device 30 is attached to a moving device that is not illustrated. The moving device is constituted of, for example, a manipulator, and moves the LMD device 30.

In the first material-to-be-bonded forming step P1, the beads 34 extending in one direction are moved while the LMD device 30 is moved in a direction orthogonal to the paper surface of FIG. 3. A surface formed of the aluminum A is formed by forming the beads 34 without a gap. Moreover, the first material to be bonded 11 is formed by laminating the surface formed of the aluminum A.

The energy of the laser light 32 of the LMD device 30 is adjusted such that the temperature of the particles (filler material) of the aluminum A is equal to or higher than a melting point (660.3° C.) of the aluminum.

In the first material-to-be-bonded forming step P1, it is possible to use a device that can laminate the metallic material, without being limited to the LMD device 30.

As the device that can laminate the metallic material, a device that can continuously dispose linear metal, for example, a welding robot or a three-dimension (3D) printer for metal can be adopted. In a case where the first material to be bonded 11 is formed by welding, welding methods, such as electric arc welding, can be appropriately used.

In the first material-to-be-bonded forming step P1, for example, the first material to be bonded 11 may be formed by casting, or a member formed of the aluminum A may be prepared.

The surface 11a of the first material to be bonded 11 on which the dissimilar metal laminated layer structure is formed may be a flat surface, or may be a curved surface or a spherical surface.

Figure 4:
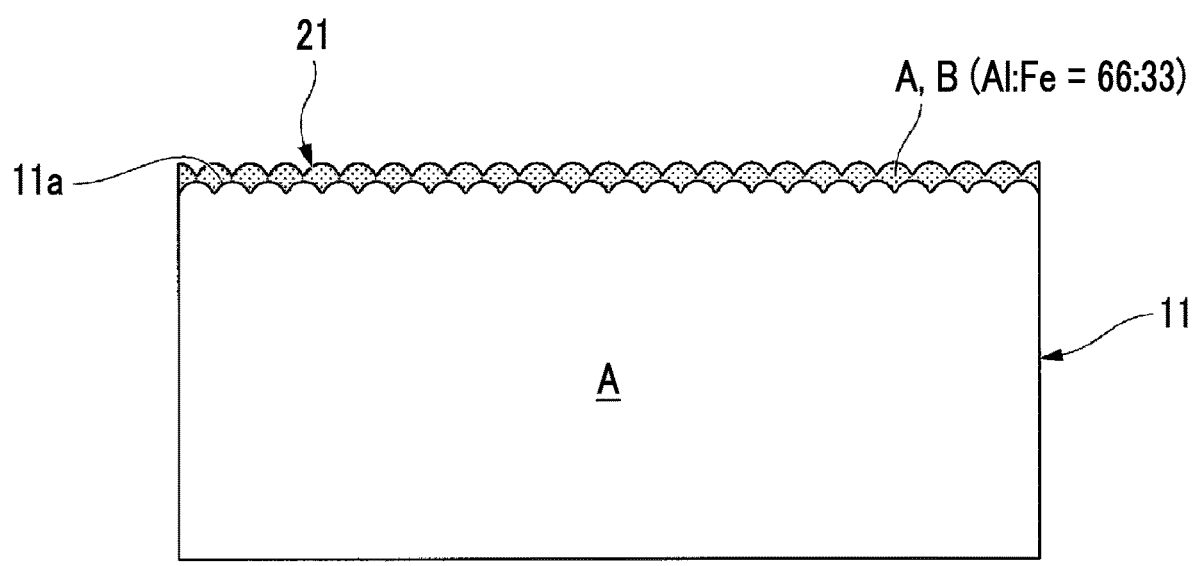
FIG. 4 is a schematic view illustrating a first dissimilar metal layer forming step of a laminating sequence of the first embodiment of the invention as seen from the side.
Figure 5:
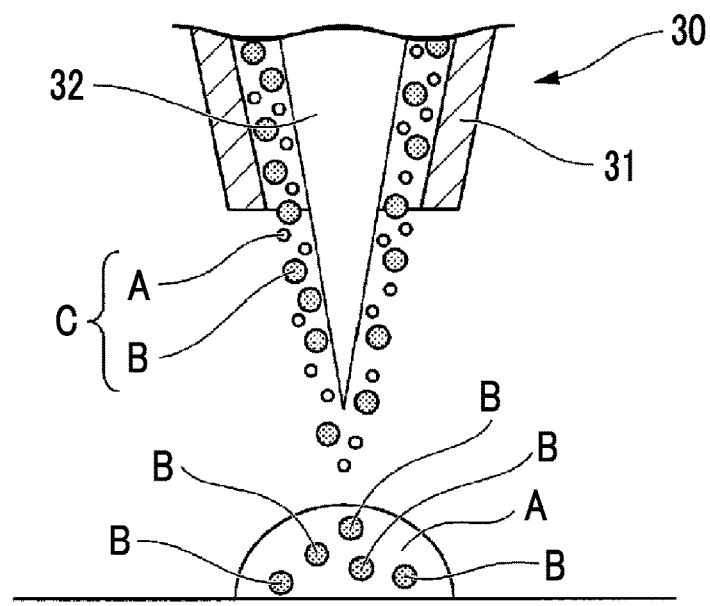
FIG. 5 is a detailed view of metallic particles jetted from a nozzle of an LMD device of the first embodiment of the invention.
Figure 6:
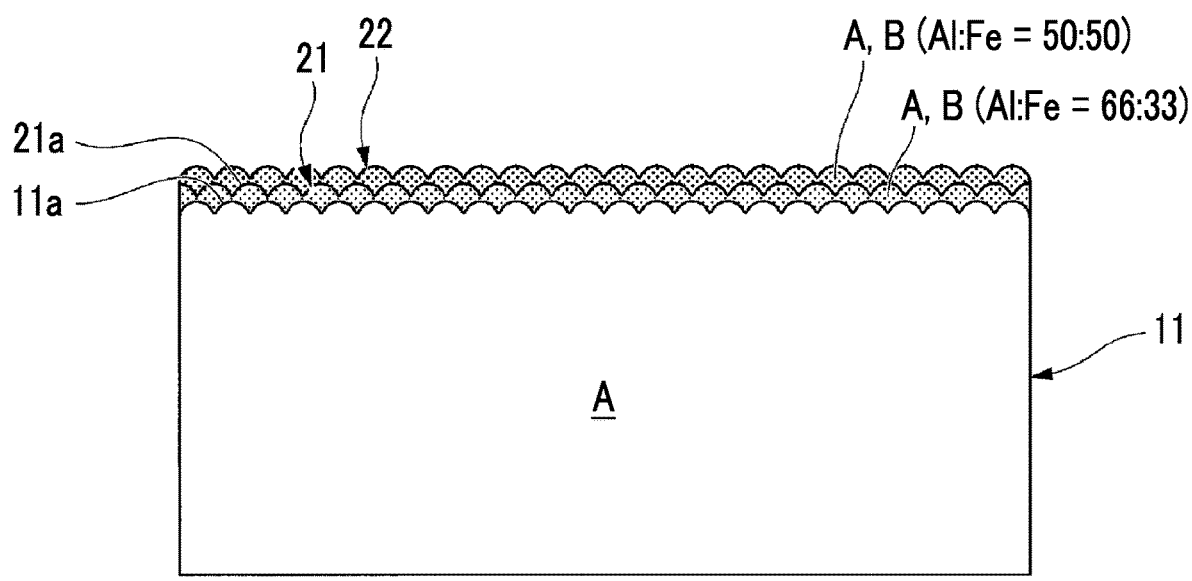
FIG. 6 is a schematic view illustrating a second dissimilar metal layer forming step of the laminating sequence of the first embodiment of the invention as seen from the side.
Figure 7:
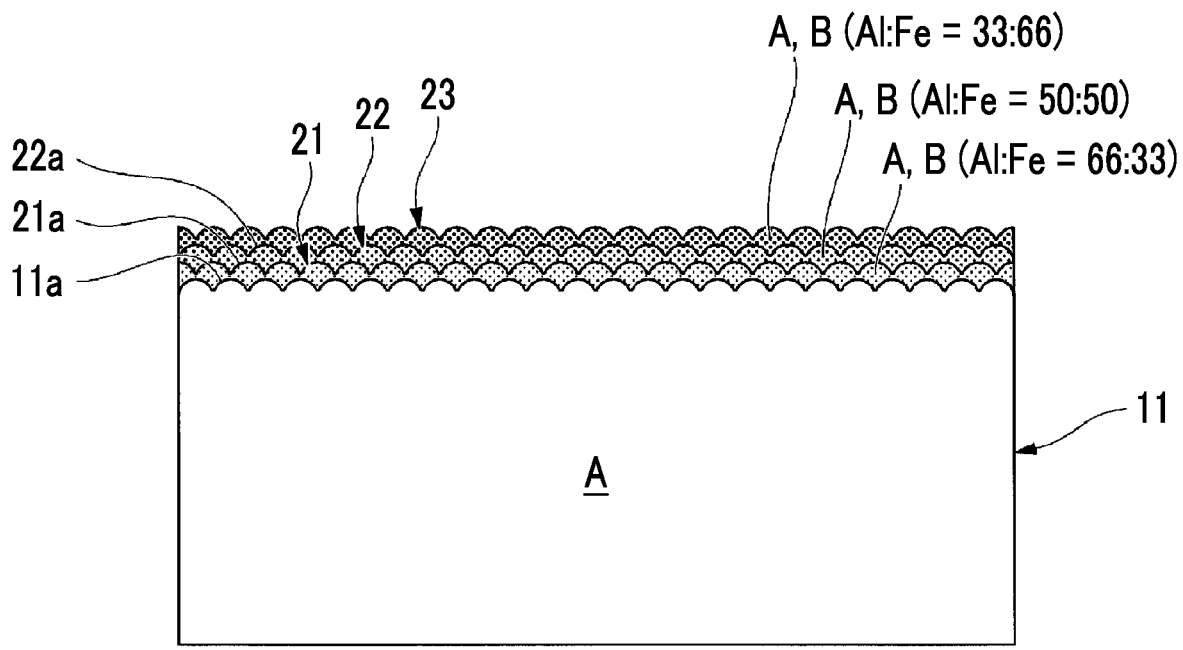
FIG. 7 is a schematic view illustrating a third dissimilar metal layer forming step of the laminating sequence of the first embodiment of the invention as seen from the side.

As illustrated in FIGS. 4, 6, and 7, the dissimilar metal layer forming steps P2, P3, and P4 are steps of supplying the mixed filler material C (refer to FIG. 5) having the particles of the aluminum A and the particles of the iron B, to the surface 11a of the first material to be bonded 11, and then heating the mixed filler material C, thereby forming the dissimilar metal layers 21, 22, and 23. The mixed filler material C is a filler material in which the particles of the metallic material of the aluminum A, and the particles of the iron B are mixed with each other.

The second dissimilar metal layer forming step P3 is a step of laminating the second dissimilar metal layer 22 on a surface 21a of the first dissimilar metal layer 21 formed in the first dissimilar metal layer forming step P2, and the third dissimilar metal layer forming step P4 is a step of laminating the third dissimilar metal layer 23 on a surface 22a of the second dissimilar metal layer 22 formed in the second dissimilar metal layer forming step P3.

The ratio of the aluminum A and the iron B that constitute the mixed filler material C varies in the first dissimilar metal layer forming step P2, the second dissimilar metal layer forming step P3, and the third dissimilar metal layer forming step P4.

The methods P2, P3, and P4 for bonding dissimilar metals to each other in the present embodiment adjust the amounts of supply of the particles (filler material) of the aluminum A and the particles (filler material) of the iron B such that the ratio of the iron B is larger as the laminating sequence increases in the formation of the dissimilar metal laminated layer structure 20.

As illustrated in FIG. 4, the first dissimilar metal layer 21 is formed on the surface lie of the first material to be bonded 11 by the first dissimilar metal layer forming step P2 of the laminating sequence. By performing the formation of the beads with the mixed filler material C without a gap, a surface formed of the aluminum A and the iron B are formed.

As illustrated in FIG. 5, in the methods P2, P3, and P4 for bonding dissimilar metals to each other, the mixed filler material C having the particles of the aluminum A and the particles of the iron B is supplied from the jet port of the nozzle 31 of the LMD device 30. As the mixed filler material C is heated with the laser light 32, the aluminum A is melted, and the particles of the iron B are dispersed within the aluminum A.

For example, a volume ratio Al:Fe of the aluminum A and the iron B in the mixed filler material C to be used in the first dissimilar metal layer forming step P2 is 66:33. That is, in the first dissimilar metal layer forming step P2, the proportion of the aluminum A is larger than the proportion of the iron B. Accordingly, in the metals that constitute the first dissimilar metal layer 21, the volume ratio Al:Fe of the aluminum A and the iron B is 66:33.

It is preferable that the particle diameter of the particles of the aluminum A is, for example, 40±10 μm and, and the particle diameter of the particles of the iron B is, for example, 100±20 μm. That is, the particle diameter of the particles of the aluminum A is sufficiently smaller than the particle diameter of the particles of the iron B. By setting such particle diameters, the aluminum A is more easily melted.

In addition, the particle diameter of the particles of the aluminum A and the particle diameter of the particles of the iron B are not necessarily made different from each other.

The energy of the laser light 32 of the LMD device is adjusted such that the temperature of the mixed filler material C is equal to or higher than the melting point (660.3° C.) of the aluminum and equal to or lower than the melting point (1538° C.) of the iron B.

Accordingly, the aluminum A melts while the iron B does not melt and the dissimilar metal layers 21, 22, and 23 in which the particles of the iron B are dispersed in the aluminum A are formed. The melted aluminum A is welded to the first material to be bonded 11. In addition, in the dissimilar metal layers 21, 22, and 23, an intermetallic compound is formed on a surface layer of the particles of the iron B. However, as the aluminums A that constitute the dissimilar metal layers 21, 22, and 23 are firmly combined with each other, this intermetallic compound does not greatly influence strength.

As illustrated in FIG. 6, the second dissimilar metal layer 22 is formed on the surface 21a of the first dissimilar metal layer 21 by the second dissimilar metal layer forming step P3 of the laminating sequence.

For example, the volume ratio Al:Fe of the aluminum A and the iron B in the mixed filler material C to be used in the second dissimilar metal layer forming step P3 is 50:50. That is, in the second dissimilar metal layer forming step P3, the proportion of the iron B is larger compared to the mixed filler material C to be used in the first dissimilar metal layer forming step P2.

Accordingly, in the metals that constitute the second dissimilar metal layer 22, the volume ratio Al:Fe of the aluminum A and the iron B is 50:50.

As illustrated in FIG. 7, the third dissimilar metal layer 23 is formed on the surface 22a of the second dissimilar metal layer 22 by the third dissimilar metal layer forming step P4 of the laminating sequence.

For example, the volume ratio A:B of the aluminum A and the iron B in the mixed filler material C to be used in the third dissimilar metal layer forming step P4 is 33:66. That is, in the third dissimilar metal layer forming step P4, the proportion of the iron B is larger compared to the mixed filler material C to be used in the second dissimilar metal layer forming step P3.

Accordingly, in the metals that constitute the third dissimilar metal layer 23, the volume ratio Al:Fe of the aluminum A and the iron B is 33:66.

As described above, the dissimilar metal laminated layer structure 20 in which the proportion of the iron B is larger as the laminating sequence increases is formed by the dissimilar metal layer forming steps P2, P3, and P4.

Figure 8:
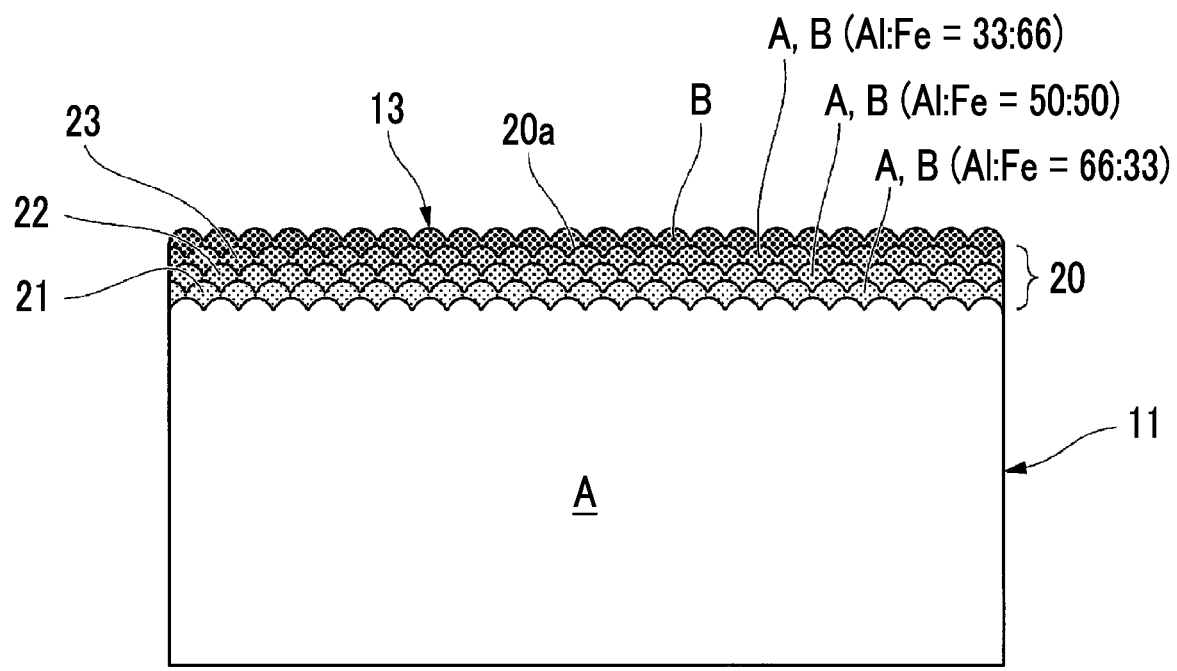
FIG. 8 is a schematic view illustrating a second metal layer forming step of the first embodiment of the invention as seen from the side.

As illustrated in FIG. 8, the second metal layer forming step P5 is a step of laminating the second metal layer 13, which is a layer formed of the iron B, on the surface 20a of the dissimilar metal laminated layer structure 20. The filler material is constituted of only the particles of the iron B.

The energy of the laser light 32 of the LMD device 30 is adjusted such that the temperature of the particles (filler material) of the iron B is equal to or higher than the melting point (1538° C.) of the iron. This melts the particles of the iron B.

The second material-to-be-bonded welding step P6 is a step of welding the second material to be bonded 12 formed of the iron B to the second metal layer 13. Accordingly, the bonding joint 1 as illustrated in FIG. 1 is completed.

In addition, in the second material-to-be-bonded welding step P6, the second material to be bonded 12 does not need to be laminated using the LMD device 30. For example, the second material to be bonded 12 that is separately prepared may be welded.

According to the above embodiment, the aluminum A that constitutes the dissimilar metal layers 21, 22, and 23 is welded to the first material to be bonded 11, and the second metal layer 13 and the iron B dispersed in the second dissimilar metal layers 21, 22, and 23 are welded to each other when the second metal layer 13 is formed. Next, by welding the second material to be bonded 12 to the second metal layer 13, it is possible to secure required strength and perform bonding even in combinations of metals that produce a weak intermetallic compound by being mixed with each other.

Additionally, in the dissimilar metal laminated layer structure 20, the bonding strength between the first material to be bonded 11 and the second material to be bonded 12 can be increased by changing the proportion of the iron B so as to become gradually larger.

Additionally, the aluminum A can be more easily melted by making the particle diameter of the particles of the aluminum A constituting the mixed filler material C smaller than the particle diameter of the particles of the iron B.

In addition, in the above embodiment, the aluminum A is used as the first metal and the iron B is used as the second metallic material. However, the invention is not limited to this. For example, two kinds of metals suitable for welding between the dissimilar metals may be used. For example, the invention is also applicable to a combination of aluminum and titanium (Ti), a combination of titanium and nickel (Ni), a combination of titanium and iron, a combination of aluminum and nickel, a combination of copper and nickel, and the like.

Additionally, in the above embodiment, the dissimilar metal layer forming steps P2, P3, and P4 are three steps. However, the invention is not limited to this, and steps may be further increased. Accordingly, the bonding strength between the dissimilar metal layers can be enhanced.

Additionally, in the above embodiment, the particle diameter of the particles of the aluminum A and the particle diameter of the particles of the iron B are made different from each other. However, the particle diameter of the particles of the aluminum A and the particle diameter of the particles of the iron B may be the same as each other. However, in a case where dissimilar metals with no large difference in melting point are bonded to each other, it is preferable to make a difference in particle diameter. As the melting points of the dissimilar metals are closer to each other, the particle diameters may be made greatly different from each other.

First Modification Example

Next, a first modification example of the first embodiment will be described.

In the method for bonding dissimilar metals to each other in the first modification example, the plurality of dissimilar metal layer forming steps P2, P3, and P4 are executed such that the particle diameter of the particles of the iron B become sequentially smaller as the laminating sequence increases.

For example, the particle diameter of the particles of the iron B is set to about 100 μm in the first dissimilar metal layer forming step P2 of the laminating sequence, and the particle diameter of the particles of the iron B is set to about 30 μm in the third dissimilar metal layer forming step P4.

According to the above modification example, the particles of the iron B can be gradually melted without changing the heating temperature in welding. Accordingly, the bonding strength between the dissimilar metal laminated layer structure 20 and the second metal layer 13 can be increased.

Second Modification Example

Next, a second modification example of the first embodiment will be described.

In the method for bonding dissimilar metals to each other in the second modification example, the plurality of dissimilar metal layer forming steps P2, P3, and P4 are executed such that the heating temperature of the mixed filler material C becomes higher as the laminating sequence increases.

For example, in the first dissimilar metal layer forming step P2, the energy of the laser light 32 is set to an energy level such that the temperature of the mixed filler material C is about 10° C. higher than the melting point of aluminum, and in the third dissimilar metal layer forming step P4, the energy of the laser light 32 is set to an energy level such that the temperature of the mixed filler material C is about 10° C. lower than the melting point of iron.

With such a configuration, the powder of the iron B dispersed in the aluminum A can be gradually dissolved as the laminating sequence increases.

According to the above modification example, the particles of the iron B can be gradually melted as the laminating sequence increases. Accordingly, the bonding strength between the dissimilar metal laminated layer structure 20 and the second metal layer 13 can be increased.

Second Embodiment

Hereinafter, a method for bonding dissimilar metals to each other in a second embodiment of the invention will be described in detail with reference to the drawings. In addition, in the present embodiment, differences from the above-described first embodiment will be mainly described, and the description of the same portions will be omitted.

Figure 9:
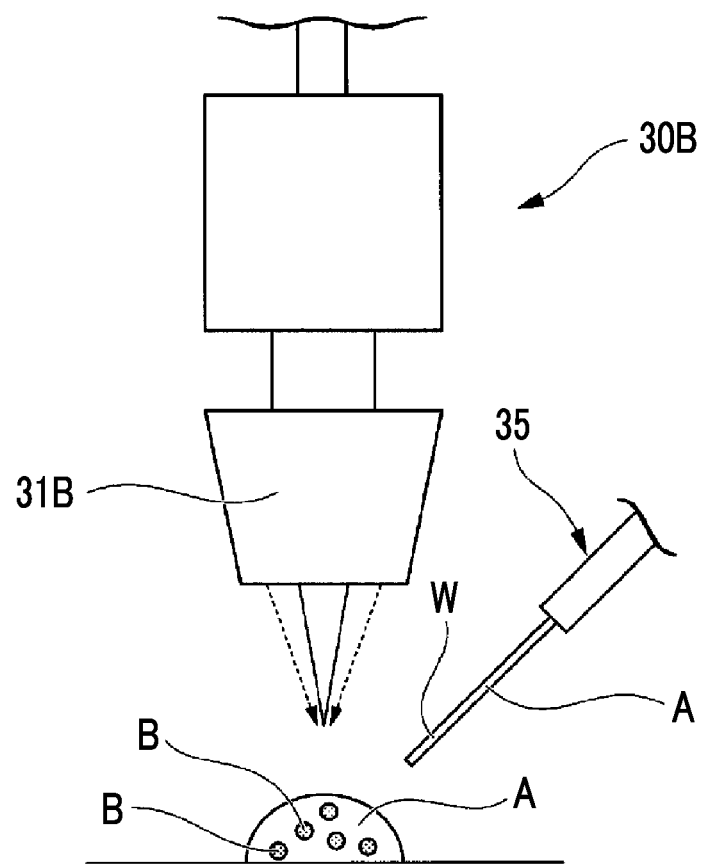
FIG. 9 is a schematic view of a welding device used in the method for bonding dissimilar metals to each other in the second embodiment of the invention.

As illustrated in FIG. 9, in the method for bonding dissimilar metals to each other in the present embodiment, a welding device 30B for forming the dissimilar metal layers 21, 22, and 23 supplies the aluminum A in a wire.

That is, the welding device 30B of the present embodiment includes a nozzle 31B having a radiation hole through which the laser light 32 is radiated, and a jet port through which iron particles are jetted, and a wire supply device 35 that supplies wire W of the aluminum A.

According to the above embodiment, a layer of the aluminum A can be formed without using aluminum powder by supplying the aluminum A in the wire W. That is, problems, such as diffusion of the aluminum powder, can be eliminated. Additionally, it is unnecessary to process aluminum, which is difficult to be processed into fine powder.

Here, the amount of supply of aluminum can be adjusted by changing the feed speed or diameter of the wire.

[Application to Turbine Rotor]

The method for bonding dissimilar metals to each other in the present embodiment can be used for the connection between a turbine wheel and a rotor shaft that constitute the turbine rotor.

Figure 10:
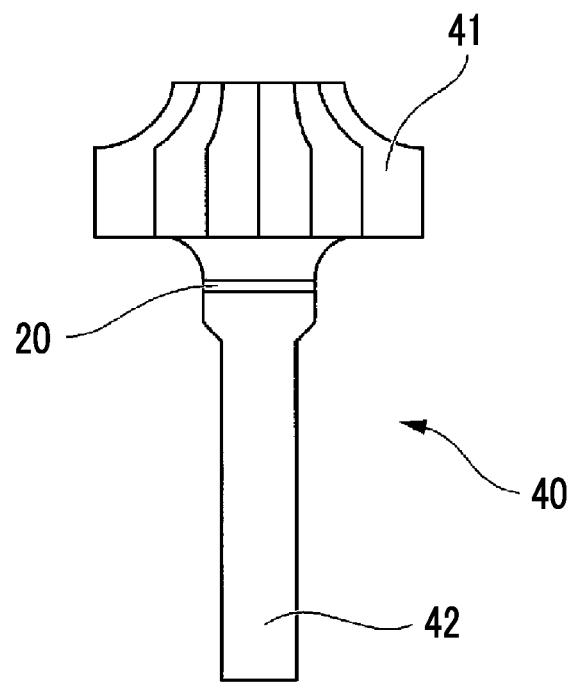
FIG. 10 is a schematic view of a turbine rotor that can be manufactured by the method for bonding dissimilar metals to each other in the invention.

As illustrated in FIG. 10, the turbine rotor 40 has a turbine wheel 41 and a rotor shaft 42, and uses the method for bonding dissimilar metals to each other in the embodiment of the invention for the bonding between the turbine wheel 41 and the rotor shaft 42. The dissimilar metal laminated layer structure 20 is formed on a bonding surface between the turbine wheel 41 and the rotor shaft 42.

Since the turbine wheel 41 requires heat resistance, the turbine wheel 41 is formed of, for example, titanium, and since the rotor shaft 42 does not require particularly the heat resistance, the rotor shaft 42 can be formed of, for example, iron.

With such a configuration, for example, even in a case where the turbine wheel 41 is formed of a metal having the heat resistance, the rotor shaft 42 is formed of a metal that does not require the heat resistance, and the turbine wheel and the rotor shaft are bonded to each other, it is possible to secure required strength and perform the bonding.

[Application to Ship]

The method for bonding dissimilar metals to each other in the invention can be used for a T-shaped bonding joint that is used when a hull structure of a ship is constructed.

Figure 11:
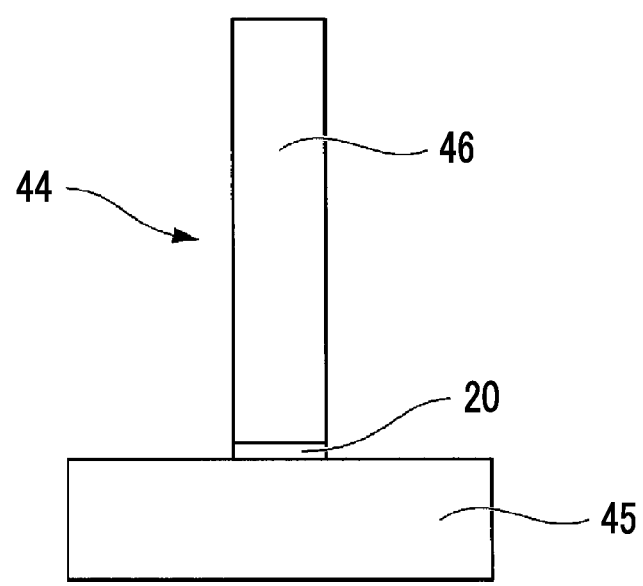
FIG. 11 is a schematic view of a T-shaped bonding joint that can be manufactured by the method for bonding dissimilar metals to each other in the invention and is used when a hull structure of a ship is constructed.

As illustrated in FIG. 11, a T-shaped bonding joint 44 is a joint in which a base material 45 and a member 46, such as a step of a longitudinal rib (not illustrated) of the hull structure of the ship (not illustrated) or a face (not illustrated) and a web (not illustrated) of a build-up lounge (not illustrated), are combined with each other in a T shape.

The method for bonding dissimilar metals to each other in the embodiment of the invention is used for the bonding between the base material 45 and the member 46. The dissimilar metal laminated layer structure 20 is formed on the bonding surface between the base material 45 and the member 46.

With such a configuration, in the bonding joint 1 to be used in the hull structure, even in the combination of the dissimilar metals, it is possible to secure required strength and perform the bonding.

Although the embodiments of the invention have been described above in detail, various changes can be added without departing from the technical idea of the invention.

INDUSTRIAL APPLICABILITY

According to the invention, even in a combination of metals that produce a weak intermetallic compound, it is possible to secure required strength and perform the bonding.

REFERENCE SIGNS LIST

1: BONDING JOINT
11: FIRST MATERIAL TO BE BONDED
12: SECOND MATERIAL TO BE BONDED
13: SECOND METAL LAYER
20: DISSIMILAR METAL LAMINATED LAYER STRUCTURE
21: FIRST DISSIMILAR METAL LAYER
22: SECOND DISSIMILAR METAL LAYER
23: THIRD DISSIMILAR METAL LAYER
30: LMD DEVICE
31: NOZZLE
32: LASER LIGHT
33: METALLIC PARTICLE
34: BEAD
35: WIRE SUPPLY DEVICE
40: TURBINE ROTOR
41: TURBINE WHEEL
42: ROTOR SHAFT
44: T-SHAPED BONDING JOINT
45: BASE MATERIAL
46: MEMBER
A: ALUMINUM (FIRST METAL)
B: IRON (SECOND METAL)
C: MIXED FILLER MATERIAL
P1: FIRST MATERIAL-TO-BE-BONDED FORMING STEP
P2, P3, P4: DISSIMILAR METAL LAYER FORMING STEP
P5 SECOND METAL LAYER FORMING STEP
P6: SECOND MATERIAL-TO-BE-BONDED WELDING STEP

The invention claimed is:

1. A method for bonding dissimilar metals to each other, the method comprising:
   providing a first material, including a first metal, to be bonded to a second material, including a second metal, the first and second metals being the dissimilar metals;
   a dissimilar metal layer forming step of supplying a mixed filler material, including a filler material formed of the first metal and particles formed of the second metal having a higher melting point than the first metal, to a surface of the first material, and heating the mixed filler material to a temperature equal to or higher than a melting point of the first metal and lower than a melting point of the second metal, to form a dissimilar metal layer;
   a second metal layer forming step of supplying a filler material formed of the second metal to a surface of the dissimilar metal layer, and heating the filler material formed of the second metal to a temperature equal to or higher than the melting point of the second metal, to form a second metal layer formed of the second metal; and
   a second material-to-be-bonded welding step of welding the second material to the second metal layer.

2. The method for bonding dissimilar metals to each other according to claim 1,
   wherein a dissimilar metal laminated layer structure in which a plurality of the dissimilar metal layers are sequentially laminated is formed by repeating the dissimilar metal layer forming step,
   wherein execution is made such that a proportion of the first metal in the mixed filler material to be used in a first dissimilar metal layer forming step of a laminating sequence is larger than a proportion of the second metal, and
   wherein second and subsequent dissimilar metal layer forming steps of the laminating sequence are executed such that, as the laminating sequence increases, the proportion of the second metal becomes sequentially larger and the proportion of the first metal becomes sequentially smaller.

3. The method for bonding dissimilar metals to each other according to claim 1,
wherein a dissimilar metal laminated layer structure in which a plurality of the dissimilar metal layers are sequentially laminated is formed by repeating the dissimilar metal layer forming step, and
wherein the plurality of dissimilar metal layer forming steps are executed such that a particle diameter of each of particles of the second metal becomes sequentially smaller as the laminating sequence increases.

4. The method for bonding dissimilar metals to each other according to claim 1,
wherein a dissimilar metal laminated layer structure in which a plurality of the dissimilar metal layers are sequentially laminated is formed by repeating the dissimilar metal layer forming step, and
wherein the plurality of dissimilar metal layer forming steps are executed such that a heating temperature of the mixed filler material becomes higher as the laminating sequence increases.

5. The method for bonding dissimilar metals to each other according to claim 1,
wherein the filler material formed of the first metal is a wire.

* * * * *